(12) United States Patent
Reddy et al.

(10) Patent No.: US 6,507,789 B1
(45) Date of Patent: Jan. 14, 2003

(54) GEAR TRANSMISSION CONDITION MONITORING METHOD AND APPARATUS

(75) Inventors: Suresh Baddam Reddy, Erie, PA (US); Gerald Burt Kliman, Niskayuna, NY (US); Birsen Yazici, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 112 days.

(21) Appl. No.: 09/618,440

(22) Filed: Jul. 18, 2000

(51) Int. Cl.$^7$ .............................................. G06F 19/00
(52) U.S. Cl. .......................................... 702/34; 73/162
(58) Field of Search ........................... 702/34; 73/162; 706/52; 356/319; 382/275

(56) References Cited

U.S. PATENT DOCUMENTS

| | | | |
|---|---|---|---|
| 4,872,337 A | * 10/1989 | Watts et al. ................ | 73/162 |
| 4,965,513 A | 10/1990 | Haynes et al. | |
| 5,131,746 A | * 7/1992 | O'Rourke et al. .......... | 356/319 |
| 5,461,329 A | 10/1995 | Linehan et al. | |
| 5,483,833 A | 1/1996 | Dickens et al. | |
| 5,487,302 A | 1/1996 | Casada et al. | |
| 5,512,843 A | 4/1996 | Haynes | |
| 5,578,937 A | 11/1996 | Haynes et al. | |
| 5,644,458 A | 7/1997 | Schoen et al. | |
| 5,661,386 A | 8/1997 | Kueck et al. | |
| 5,726,905 A | 3/1998 | Yazici et al. | |
| 5,742,522 A | 4/1998 | Yazici et al. | |
| 5,805,742 A | * 9/1998 | Whitsitt ...................... | 382/275 |
| 6,301,572 B1 | * 10/2001 | Harrison ...................... | 706/52 |

OTHER PUBLICATIONS

K. Fukunaga, "Introduction to Statistical Pattern Recognition", $2^{ND}$ Edition, 1990, pp. 76–77.
A. Papoulis, "Probability, Random Variables, and Stochastic Processes", $3^{RD}$ Edition, 1991, p. 250.
J. Tou, et al., "Pattern Recognition Principles", 1974, pp. 124–130.
U.S. pat. application entitled "Closed Loop Control of Roll Speeds in Plastic Sheet Extrusion" by S. Reddy, et al, Ser. No. 09/253,709, Filed Feb. 2, 1999, Attorney Docket No. RD–25,000.

* cited by examiner

Primary Examiner—John S. Hilten
Assistant Examiner—Xiuqin Sun
(74) Attorney, Agent, or Firm—Ann M. Agosti; Patrick K. Patnode

(57) ABSTRACT

A gear transmission monitoring method includes: forming a good operating condition baseline matrix by, for each of a plurality of different gear mesh frequencies, obtaining a good operating condition signal indicative of gear transmission conditions over a segment of time and transforming the obtained good operating condition signal into a good operating condition time-frequency spectrum; and then obtaining a gear mesh frequency and a test signal over a segment of time, transforming the obtained test signal into a test time-frequency spectrum, and using the gear mesh frequency and the good operating condition baseline matrix to examine the test time-frequency spectrum to monitor gear transmission conditions.

29 Claims, 3 Drawing Sheets

US 6,507,789 B1

GEAR TRANSMISSION CONDITION MONITORING METHOD AND APPARATUS

BACKGROUND

The invention relates generally to machine monitoring and more particularly to gear transmission condition monitoring.

Locomotive traction systems include traction motors, gears, gear cases, axles, wheel-sets, and bearings. The gear cases are often lubricated with oil, and the pinion gear is sometimes fitted onto the traction motor shaft using an interference or shrink fit. In some situations, the oil in the gear case also lubricates motor bearings through a passage from the gear case to the bearings. There are several failures that can result in gear problems, including, for example, cracks in gear teeth due to excessive loading and loss of lubrication resulting in gear teeth wear. Gear problems can lead to gear damage, slipping of pinion gear on the motor shaft, damage to bearings from vibrations and/or loss of lubrication that results in motor failures, and ultimately road failures. Prevention of serious gear, bearing, motor and road failures through incipient failure detection would therefore be desirable.

Haynes et al., U.S. Pat. No. 4,965,513, describes a motor current signature analysis method for diagnosing motor operated devices such as motor-operated valves (MOVs). Frequency domain signal analysis techniques are applied to a conditioned motor current signal to identify various operating parameters of the motor-driven device from the motor current signature. Motor current noise is assumed to include the sum of all the mechanical load changes which refer back to the electric motor drive, and the changes are described as being separated on a frequency and amplitude basis such that the source of various changes in load, such as periodic gear mesh loading, friction events at frequencies corresponding to their origin, and other motor load varying characteristics of the device, can be identified. Motor current noise signatures are taken at different periods during the operating life of the device and compared to determine aging and wear or abnormal operating characteristics. The embodiment of Haynes et al. appears to assume a fixed frequency system with a signal-to-noise ratio that is high enough (that is, any interfering signals are low enough) for accurate signal detection. MOVs operate in highly-controlled environments with well-prescribed duty cycles. Typically, MOVs run steadily for long periods and do not experience operating conditions that generate confounding signals. More sophisticated processing techniques are desirable for general industrial environments and are particularly desirable for locomotive environments with varying load conditions and non-uniform track-related signals.

BRIEF SUMMARY

It would be advantageous to have a gear condition monitoring method and apparatus which can detect low-level incipient faults in the presence of varying load conditions and interfering signals.

According to one embodiment of the present invention, a gear transmission monitoring method includes: forming a good operating condition baseline matrix by, for each of a plurality of different gear mesh frequencies, obtaining a good operating condition signal indicative of gear transmission conditions over a segment of time and transforming the obtained good operating condition signal into a good operating condition time-frequency spectrum; and then obtaining a gear mesh frequency and a test signal over a segment of time, transforming the obtained test signal into a test time-frequency spectrum, and using the gear mesh frequency and the good operating condition baseline matrix to examine the test time-frequency spectrum to monitor gear transmission conditions.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTIONS

Gear wear and/or cracking increase gear tooth profile errors from the ideal involute profile and result in fluctuations which are periodic with gear mesh frequency. These fluctuations are reflected in axle and motor speeds, which in turn are reflected in motor torque, current and/or voltage depending on the mode of control (speed or torque) and bandwidth of the control system. In case of an alternating current (ac) induction machine, current or voltage signals will have modulations which depend on the mode of operation (for example, six-step or pulse width modulation (PWM)). For six-step mode, the frequency modulations are the line frequency as well as harmonics ($5^{th}$, $7^{th}$, $11^{th}$, $13^{th}$, $17^{th}$, $19^{th}$, for example) of the line frequency. For PWM mode, the modulation frequency may be a variable or fixed known frequency, for example. The gear mesh frequency and harmonics will be modulated by these modulation frequencies and show up as sidebands around the modulation frequencies in the frequency spectrum of currents or voltages. When demodulated, these signals have gear mesh error reflected near the gear mesh frequency and harmonics. The gear mesh frequency may be estimated from average motor speed using direct measurements or estimations from other signals, for example.

Figure 1:
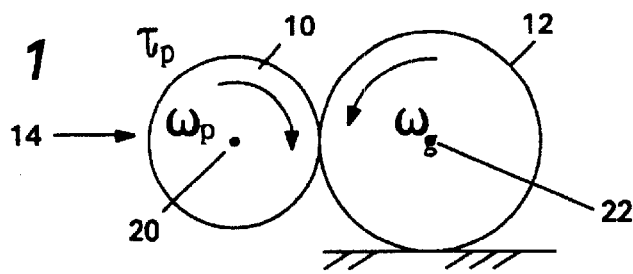
FIGS. 1 and 2 are schematic diagrams of a gear transmission.
Figure 2:
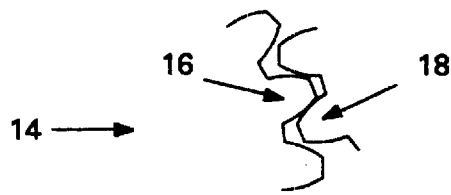

FIGS. 1 and 2 are schematic diagrams of a gear transmission 14 with FIG. 1 illustrating a large scale view of two gears (pinion gear 10 and bull gear 12) and FIG. 2 illustrating an enlarged view of several teeth 16 and 18 of the gears. The present invention is not limited to spur or helical gearing. For example, the present invention is applicable to bevel, worm and other gearing as well.

Figure 6:
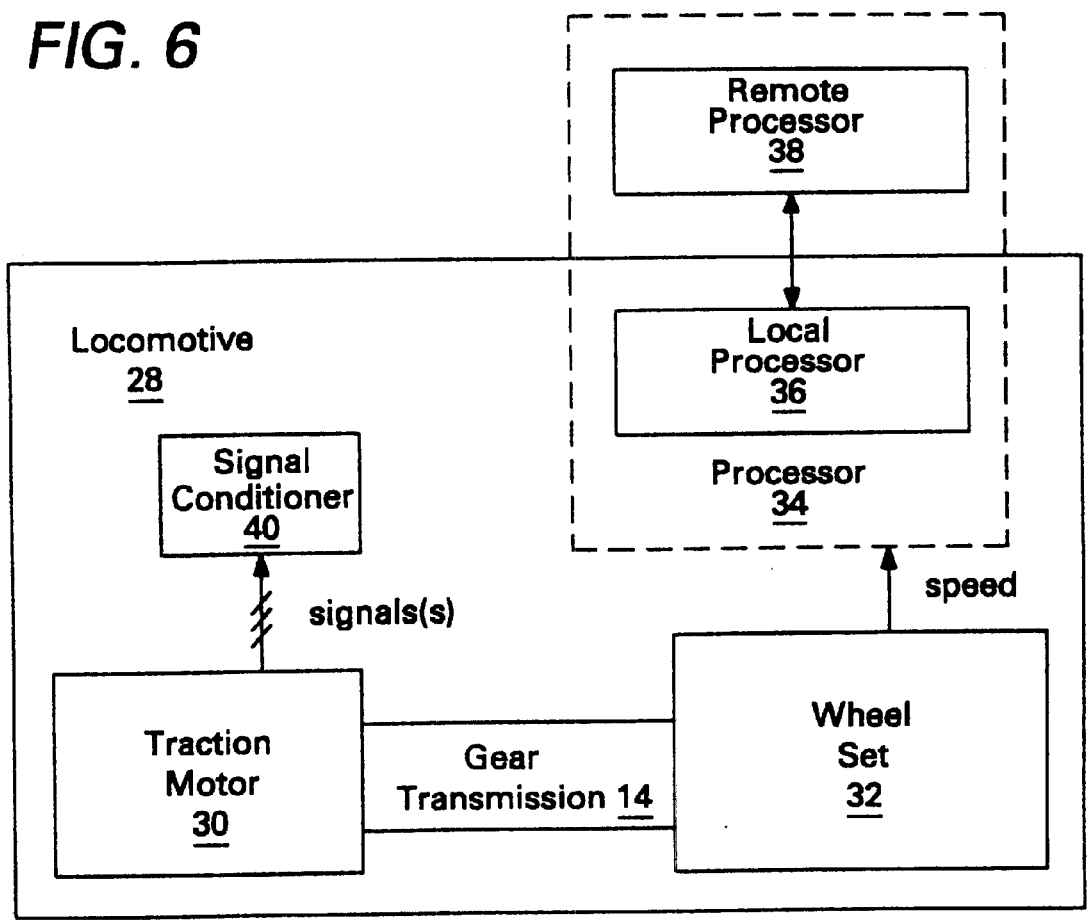
FIG. 6 is a block diagram of an example embodiment in which the present invention may be incorporated.

FIG. 6 is a block diagram of an example embodiment in which the present invention may be incorporated. A locomotive 28 includes machines shown as traction motors 30 coupled by respective gear transmissions 14 to respective wheel-sets 32. Although one set of motor, gear transmission, and wheel-set is shown for purposes of example, in practice, locomotives include multiple sets. Referring to FIGS. 1 and 6, torque $\tau_p$ is applied to the pinion gear 10 through shaft 20 of the machine (traction motor 30 in FIG. 6). Pinion gear 10 meshes with bull gear 12 (FIG. 1) which is mounted on axle 22 (FIG. 1) of wheel-set 32 (FIG. 6). The axle and wheel-set rotate along with the bull gear. The tractive effort generated at the wheel-rail interface pulls the wheel-set, locomotive, and train forward. Angular velocities of the pinion gear and bull gear are respectively labeled as $\omega_p$ and $\omega_g$ in FIG. 1.

Figure 3:
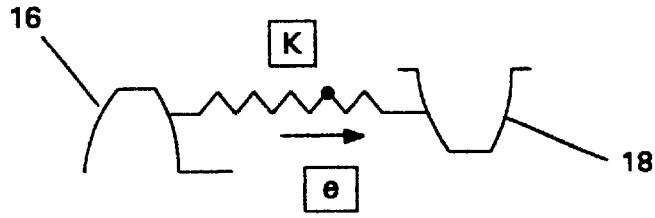
FIG. 3 is a model of gear mesh associated with the gear transmission of FIGS. 1 and 2.

FIG. 3 is a model of gear mesh associated with the gear transmission of FIGS. 1 and 2. The gear transmission error can be calculated as follows:

$$e = \Sigma e_k \sin(k\Omega t + \phi) \tag{1}$$

wherein $$\Omega = N\omega_p, \tag{2}$$

and wherein $\Omega$ represents the gear mesh frequency (motor angular velocity $\omega_p$ multiplied by number N of teeth on pinion gear 10), $e_k$, represents the kth tooth error, $\phi$ represents an arbitrary phase, and t represents time.

The gear transmission error has amplitudes at gear mesh frequency and gear mesh frequency harmonics which depend on errors such as, for example, the profile errors, manufacturing errors, and errors arising from wear and deformations. The gear transmission error is periodic with gear mesh frequency and is expected to repeat from every tooth mesh to the next mesh during gear rotation. The gear transmission error amplitudes increase with increased wear and deformation.

Increased gear transmission error results in an increase in fluctuations of pinion gear and bull gear speeds at gear meshing frequencies and harmonics. Uniform gear wear due to lubrication loss, dry gear, or cracked gear teeth results in amplification of the gear transmission error and hence the fluctuations in speeds. Using the above model of gear mesh interface, the influence of gear transmission error on motor shaft 20 and axle shaft 22 speeds can be modeled as follows:

$$J_p\dot{\omega}_p = \tau_p - Fr_p - b_p\omega_p \text{ and} \tag{3}$$

$$J_g\dot{\omega}_g = Fr_g - b_g\omega_g - f(\omega_g, v), \tag{4}$$

wherein v represents the axle translation velocity, $J_p$ and $J_g$, represent gear inertias, $b_p$ and $b_g$ represent gear viscous friction coefficients, $r_p$ and $r_g$ represent gear radii and the "." over the angular velocities represents d/dt. The function f is the resistive torque due to tractive effort resulting from adhesion between wheel and rail and is usually a nonlinear function of creep, that is, the difference in rotational and translational speeds of the wheel. The gear mesh spring force F (due to the stiffness of contact between the teeth at the gear transmission) can be represented as:

$$F = K(r_p\theta_p - e - r_g\theta_g), \tag{5}$$

wherein K represents a spring constant of the teeth and $\theta_p$ and $\theta_g$ represent angular gear positions. Thus equations 3 and 4 can be re-written as:

$$J_p\dot{\omega}_p = \tau_p - Kr_p^2\theta_p + Kr_pe + Kr_pr_g\theta_g - b_p\omega_p \text{ and} \tag{6}$$

$$J_g\dot{\omega}_g = Kr_pr_g\theta_p - Kr_ge - Kr_g^2\theta_g - b_g\omega_g - f(\omega_g, v). \tag{7}$$

Equations 6 and 7 can be simulated to determine the impact of tooth profile error on pinion and gear speeds. For high gear tooth stiffness, the rate of change of spring displacement is nearly zero such that:

$$r_p\omega_p - \dot{e} - r_g\omega_g \approx 0, \text{ and} \tag{8}$$

$$\omega_g = 1/r_g(r_p\omega_p - \dot{e}), \tag{9}$$

which permits Equations 3–4 and 6–7 to again be re-written as:

$$J_p\dot{\omega}_p = \tau_p - (J_g\dot{\omega}_g + b_g\omega_g + f(\omega_g, v))\frac{r_p}{r_g} - b_p\omega_p \tag{10}$$

$$= \tau_p - \left[\frac{J_g}{r_g^2}(r_p\dot{\omega}_p - \ddot{e}) + \frac{b_g}{r_g^2}(r_p\omega_p - \dot{e}) + f\left(\frac{1}{r_g}(r_p\omega_p - \dot{e}), v\right)\right]r_p - b_p\omega_p$$

and $$J_p\dot{\omega}_p = \tau_p - (J_g\dot{\omega}_g + b_g\omega_g + f(\omega_g, v))r_p - b_p\omega_p \tag{11}$$

$$= \tau_p - \left[\frac{J_g}{r_g^2}(r_p\dot{\omega}_p - \ddot{e}) + \frac{b_g}{r_g^2}(r_p\omega_p - \dot{e}) + f\left(\frac{(r_p\omega_p - \dot{e})}{r_g}, v\right)\right]r_p - b_p\omega_p$$

and combined as:

$$(J_p + J_gN^2)\dot{\omega}_p + (b_p + b_gN^2)\omega_p = \tag{12}$$

$$\tau_p + \left[\frac{J_g}{r_g^2}\ddot{e} + \frac{b_g}{r_g^2}\dot{e} - f\left(\frac{(r_p\omega_p - \dot{e})}{r_g}, v\right)\right]r_p.$$

Figure 4:
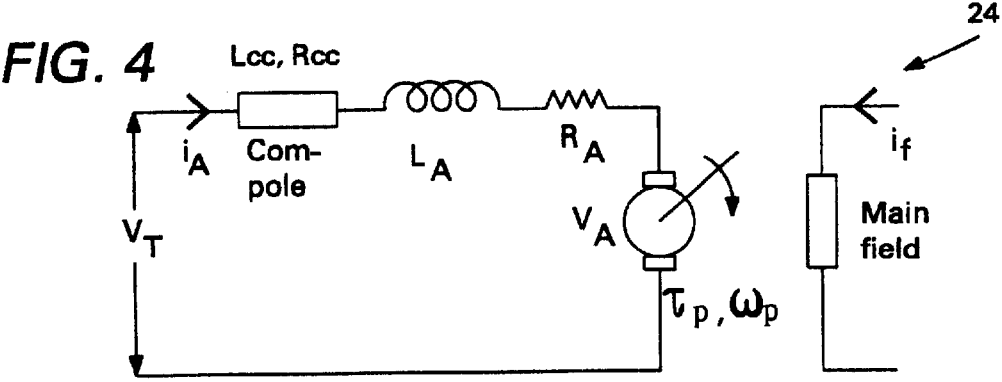
FIG. 4 is a schematic circuit diagram of a direct current machine.

FIG. 4 is a schematic circuit diagram of a direct current machine 24 which can be used to formulate equations representing the relationship between motor voltage, current, and torque to speed. An equivalent circuit can be modeled as follows:

$$(L_A + L_{CC})\frac{di_A}{dt} = V_T - V_A - i_A(R_A + R_{CC}), \tag{13}$$

wherein $L_A$ and $L_{CC}$ represent armature and commutator inductances, $R_A$ and $R_{CC}$ represent armature and commutator resistances, $i_A$ represents armature current, $i_f$ represents field current, $V_T$ represents terminal voltage and $V_A$ represents armature voltage.

The equations for power conversions can be represented by:

$$\tau_p = K_T i_A$$

$$V_A = K_V \omega_p \tag{14}$$

For shunt or separately excited motors, $K_v$, $K_T$ are constants for a given $i_f$, and are equal in consistent units. For series dc machines (typically used in conventional locomotives), field windings are in series with armature, and hence:

$$i_f = i_A$$

$$\tau_p = K'_T i_A^2.$$

$$V_A = K'_V i_A \omega_p \tag{15}$$

The overall behavior of speed, current, torque and voltage in response to gear transmission error is a function of the mode of control and controller bandwidth relative to gear transmission error frequency content (gear mesh frequency and harmonics). Normally, processor bandwidths are sufficiently low as compared to gear mesh frequencies, and processor influence can be ignored.

Figure 5:
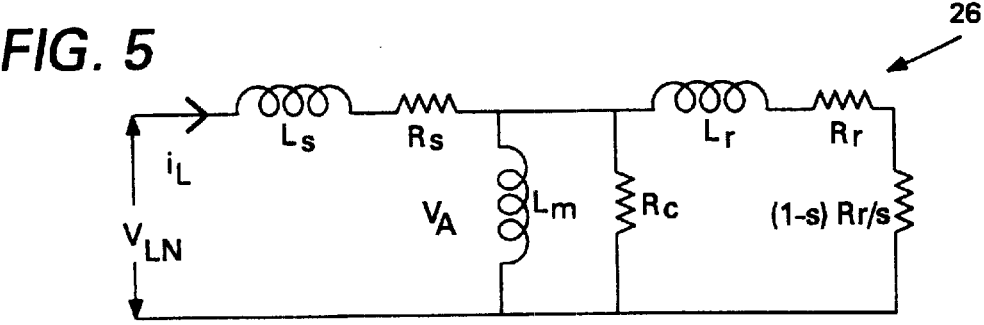
FIG. 5 is a schematic circuit diagram of an alternating current machine.

FIG. 5 is a schematic per phase circuit diagram of an alternating current induction machine (typically used in high power locomotives) wherein $V_{LN}$ represents the line to neutral voltage, $i_L$ represents the line current, s represents per unit slip between synchronous and rotor mechanical frequencies, Rs represents stator resistance, Rr represents rotor resistance, and Rc represents core loss equivalent resistance. The per unit slip can be modeled as follows:

$$s = \frac{(f_s - f_m)}{f_s}, \tag{16}$$

wherein $$f_s = \frac{f_l}{P} \tag{17}$$

and represents the line frequency divided by the number of pole pairs; and $$f_m = \frac{\omega_p}{2\pi} \tag{18}$$

and represents the motor rotor mechanical frequency, i.e., motor shaft angular velocity divided by $2\pi$.

The power in the "resistance" $(1-s)R_r/s$ is that converted to mechanical power on the motor shaft leading to torque $\tau_p$ and angular velocity $\omega_p$. The modulation may be a six-step square wave at line frequency, resulting in fundamental and harmonics frequency content in voltage/current signals. Pulse width modulation may be used at a fixed or variable frequency. A simplification of the circuitry can yield a linear relationship between motor torque and speed and a linear relationship between motor torque and current amplitude at line frequency. Gear mesh frequency and harmonics in motor speed will be reflected into motor torque and motor current/voltage. However, due to modulations, the gear mesh frequencies show up as modulated frequencies (in the six step wave modulation, for example, as fundamental +/− gear mesh frequencies and harmonics +/− gear mesh frequencies). The current signal can be demodulated, and the frequency content can be examined for influence of gear transmission error. Thus when the present invention is used to monitor an alternating current induction machine, using the gear mesh frequency to examine the spectrum to monitor gear transmission conditions includes modulating the gear mesh frequency and using the modulated gear mesh frequency to monitor gear transmission conditions.

In accordance with an embodiment of the present invention, a gear transmission condition monitoring method includes: forming a good operating condition baseline matrix by, for each of a plurality of different gear mesh frequencies, obtaining a signal indicative of gear transmission conditions over a segment of time and transforming the obtained signal into a time-frequency spectrum; and then obtaining a gear mesh frequency and the signal over a segment of time, transforming the obtained signal into a time-frequency spectrum, and using the gear mesh frequency and the good operating condition baseline matrix to examine the spectrum to monitor gear transmission conditions.

In an optional, preferred embodiment, the method further includes forming a faulty operating condition baseline matrix by operating the gear transmission under a plurality of different faulty operating conditions while, for each of a plurality of different gear mesh frequencies, obtaining a faulty operating condition signal over a segment of time and transforming the obtained faulty operating condition signal into a faulty operating condition time-frequency spectrum. In this embodiment, using the gear mesh frequency and the good operating condition baseline matrix to examine the spectrum to monitor gear transmission conditions further includes using the faulty operating condition baseline matrix to examine the test time-frequency spectrum to monitor gear transmission conditions.

Different faulty operating conditions include conditions such as, for example, worn gear and low lubrication conditions. In one embodiment, load information is additionally obtained and used along with the gear mesh frequency. A processor 34 (shown in FIG. 6) including one or more processors (shown for purposes of example as local processor 36 and remote processor 38) can receive the signals from traction motor 30 (via signal conditioner 40, for example) and/or from wheel set 32 and perform the steps in the pre-processing, learning, and operation stages.

The preprocessing stage begins with signal acquisition. As shown above, useful signals include signals such as speed and machine current, voltage, and/or torque. These signals, may be obtained and/or estimated in any appropriate manner. As examples, shaft 20 (FIG. 1) speed may be measured by a speed sensor; axle 22 (FIG. 1) speed may be measured by a speed sensor such as a vertical/triaxial accelerometer mounted on the gear case or motor frame, for example; machine torque may be measured by a torque transducer, or calculated from motor current and voltage signals; motor current or voltage may be measured by a conventional current and voltage sensors—in ac induction motors, the measurement can be on any or all phases. Measurements used to obtain the signals each have a high frequency bandwidth suitable for capturing gear mesh frequency (and preferably at least the first few harmonics as well) and, if applicable, modulations. As discussed above, motor speed information can be used to calculate the gear mesh frequency.

The sampling frequency of signal measurement may be either fixed or varied from data window to data window in proportion to the average speed within the previous data window. The window size (number of samples) is chosen to enable sufficient resolution for identification of gear mesh frequencies (and modulations if applicable) from other interfering frequencies (from engine/alternator and mechanical natural frequencies, for example) and to be small enough to ensure relatively constant (not varying by more than about 5%, for example) speed of motor (hence, constant gear mesh frequency) and stay within the capabilities of processor 34.

Preprocessing the signal next includes transforming the signal into a domain in which the healthy and faulty gear tooth 16 and 18 (FIG. 2) features are apparent. A good operating condition baseline matrix for FFT (fast Fourier transform) into a time-frequency spectrum within the neighborhood of gear mesh frequency and harmonics is generated with healthy, adequately-lubricated gears while running the machine at various speeds. Preferably, the good operating condition baseline matrix additionally includes baseline information obtained under a variety of load conditions. The information can either be obtained for each speed and load condition, or factorial or half-factorial design of experiment processes can be used. The good operating condition baseline matrix is then stored in processor memory.

In embodiments wherein a faulty operating condition baseline matrix is used, the baseline matrix generating process is repeated with various faults. Several examples include: (i) worn gear, and/or (ii) lack of oil in gear case.

Figure 7:
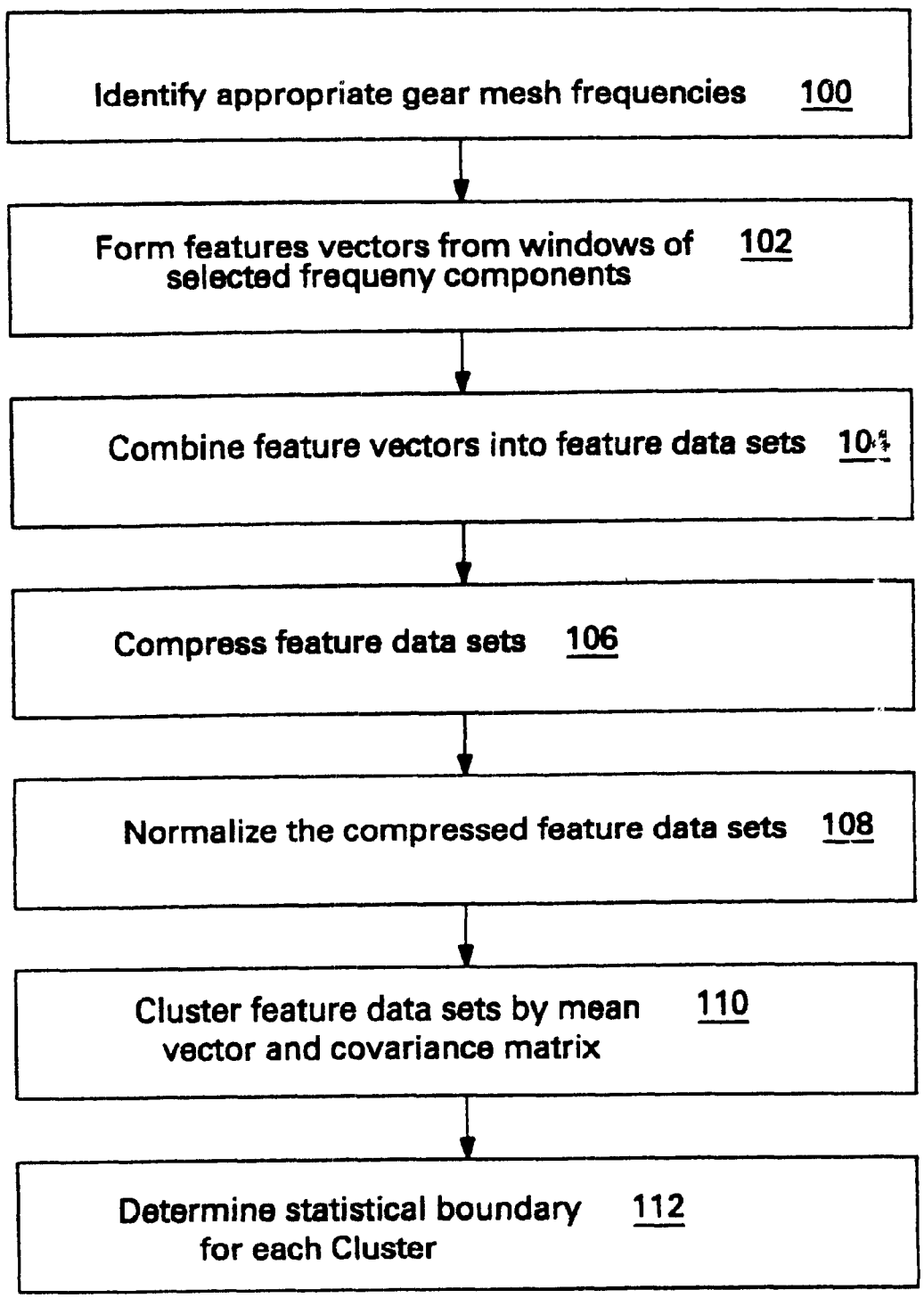
FIG. 7 is a flowchart illustrating a learning stage according to one embodiment of the present invention.

FIG. 7 is a flowchart illustrating steps useful for generating good and optional faulty operating condition baseline matrices in the learning stage according to one embodiment of the present invention. At step 100, appropriate gear mesh frequencies are identified.

As discussed above, gear, tooth wear appears in the Fourier spectrum at the gear mesh frequency components. The fundamental gear mesh frequency can be computed given the number of teeth in the gear and the speed of the motor.

Changes of interest are changes in the gear mesh frequency components which are caused by gear tooth wear. However, normal operating conditions of the motor may interfere with the change monitoring. Frequency components caused by other effects, such as engine speed and inverter harmonics may overlap with the gear mesh frequencies, and the gear mesh frequency components may vary with the time varying operating conditions of the locomotives, such as load and speed. Therefore, it is beneficial to identify the gear mesh frequencies that are remote from interfering frequencies. This information can be used to adapt the signal detection to the time varying normal operating conditions of the motor.

In a locomotive 28 (FIG. 6), for example, engine ripple interference for an AC or DC locomotive results in interfering frequencies $\Omega_e=3\omega_e N_p$ wherein $\omega_e$ represents the engine speed in Hz, and $N_p$ represents the number of pole pairs. The interference will occur whenever $\Omega_e$ is equal to the gear mesh frequencies. Interference from the locomotive traction motor 30 occurs at several instances including, for example: slot pass frequencies and harmonics for ac and dc machines $\Omega_s=\omega_p N_s$ wherein $N_s$ is the number of slots and $\omega_p$ is the angular motor speed; bar pass frequencies and harmonics in dc machines $\Omega_b=\omega_p N_b$ wherein $N_b$ is the number of bars; and once per revolution frequency and harmonics $\Omega_r=\omega_p$. Other examples include torque pulsations and harmonics $\Omega_t=6\omega_p$ and inverter harmonics.

In order to select proper gear mesh frequencies, a relationship between the gear mesh frequencies and the interference sources can be used to avoid those gear mesh frequencies which are in the close proximity of interfering frequencies. For example, in the case of engine ripple, given the speed of the engine and the motor, interference will occur whenever:

$$3\omega_e N_p M=\omega_p N_t N\pm\omega_p,\ N=1,3,5,\ldots,\ M=1,2,3,\ldots \quad (19)$$

wherein $N_t$ is the number of teeth on pinion gear 10 (FIG. 1). For each locomotive, a graphical relationship between engine and motor speed can be formed in advance to identify the engine and motor speed ranges for which interfering frequencies are minimized.

At step 102, once the appropriate gear mesh frequencies are identified, for each of the gear mesh frequencies, a window of frequency components around the gear mesh frequency can be selected to form a feature vector. The length of this window can be identified with respect to the accuracy of the speed sensor and the proximity of the interfering frequencies. Ideally, the length of this window is desired to be relatively short to avoid interferences coming from unknown sources. Once an initial window is selected, a sub-window may be chosen around the maximum frequency component within the window to decrease the length of the feature vector.

At step 104, once the feature vectors are extracted, feature vectors can be formed into feature data sets to form distinct baselines for different operating modes of the machine. Distinct operating modes of a machine may be defined by physical means or by a statistical technique. For simplicity, it can be assumed that relatively constant engine and motor speed and load conditions form a homogenous normal operating mode. In order to include unknown statistical variations, a technique, such as the one described in Yazici et al., U.S. Pat. No. 5,726,905, can be used for appropriate normalization in the feature vector.

At step 106, it is additionally useful to compress the feature vectors of the feature data sets (that is, reduce the number of feature vectors in each feature data set). Feature vector compression (optimization) has a number of benefits including: reducing communication channel and memory space requirements; providing useful features and removing non-useful signals that may otherwise tend to corrupt the analysis; reducing unnecessarily added channel and computational requirements when highly correlated features are present; and reducing the complexity of (and thus potential modeling errors associated with) analysis algorithms in processor 34.

In one embodiment, a singular value decomposition (SVD) technique is used for feature compression. The singular value decomposition decomposes an m×n matrix X into left and right singular matrices (U and V, $UV^T=I$) and a diagonal matrix ($\Sigma$) containing singular values, $$[U,\Sigma,V]=SVD(X). \quad (20)$$

To reduce computational demands, in another embodiment, respective feature vector compression includes: calculating a covariance matrix R of the feature data set; performing an eigenvalue decomposition of the covariance matrix; and using multiple columns of the eigenvalue decomposition matrix to transform the feature data set to a multi-dimensional compressed vector space.

The covariance matrix R of the feature data set $\{F_k, k=1, \ldots, N\}$ may be calculated as follows:

$$R = \frac{1}{N_f}\sum_{k=1}^{N_f}(F_k-\mu)(F_k-\mu)^T, \quad (21)$$

wherein $N_f$ represents the available feature vectors of the feature data set and $\mu$ represents the mean value of the feature data set $\{F_k, k=1, \ldots, N\}$.

Preferably, the eigenvalue decomposition is performed to find the three principle eigenvectors associated with the largest eigenvalues. The three eigenvalues constitute a projection operator that compresses multidimensional features into, for example, three dimensions for visualization and probability distribution function characterization. The eigenvalue decomposition on R can be represented as:

$$[U,\Sigma]=eig(R) \quad (22)$$

wherein $Ru_k=\lambda_k u_k$, $U=[u_1,u_2,\ldots,u_m]$, $\Sigma=diag(\lambda_1,\lambda_2,\ldots,\lambda_m)$ and m is the original dimension of the feature data set F.

The first three columns of the matrix U are then used to transform the original feature data set F to the three dimensional compressed vector space:

$$F^c=[u_1,u_2,u_3]^T F \quad (23)$$

wherein $F^c$ is the compressed three dimensional feature data set. Although a three dimensional feature data set is preferred for data visualization and validation purposes, the feature data set can be compressed into a dimension larger or smaller than three.

At step 108, after feature compression, the compressed feature data set can be normalized by characterizing a probability distribution function. In one embodiment, the normality of the data is evaluated by a normality test, such as the Anderson-Darling test, for each component of the compressed feature data set. If the compressed feature data set is not normal, the data set can be normalized to simplify the monitoring process.

Because all the feature components are positive, the distribution of each component can be approximated by a Gamma distribution. In this case, the distribution of components can be converted to a normal-like distribution by applying the following transformation:

$$F(i)=(F_c(i))^v, \ 0<v<1 \text{ and } i=1,2,3. \quad (24)$$

Typically, normalization can be achieved by selecting v=0.4.

At step 110, once the feature data sets are normalized, each feature data set can be clustered with an identified a mean vector and a covariance matrix. These values are stored in the respective operating condition baseline matrix to represent different operating modes of the locomotive.

At step 112 it is further useful to determine a statistical boundary (such as a distance measure) for each clustered feature data set. One convenient distance measure that is useful, for example, is the Mahalanobis distance which is given as:

$$d(X,(M,C))=(X-M)^T C^{-1}(X-M). \quad (25)$$

wherein (M,C) are the mean vector and the covariance matrix of a cluster, and X is the compressed, normalized feature vector. When X is normally distributed, the Mahalanobis distance d is Gamma distributed. That is, $$p(d) = \frac{1}{2^{n/2}\Gamma(n/2)} d^{\frac{n-2}{2}} e^{-d/2}, \quad d > 0, \quad (26)$$

where $\Gamma$ is the Gamma function and n is the size of the feature vector which is equal to or less than three in this example. A threshold $\tau$, for each clustered feature data set can be chosen from the Gamma distribution table such that it meets a pre-specified percentage of false alarms:

$$Pr(d>\tau)=\%\text{false alarms}. \quad (27)$$

The threshold value can be optimized to achieve a minimum total error rate (i.e., the sum of false positive alarms and false negative alarms) by including some fault data in the learning stage.

After the preprocessing and learning stages, during the operation stage, a gear mesh frequency and the signal are obtained over a segment of time, the obtained signal is transformed into a time-frequency spectrum, and the gear mesh frequency, the good operating condition baseline matrix, and, if available, the faulty operating condition baseline matrix are used to examine the spectrum (from this unknown test data) to monitor gear transmission conditions. Post-processing the data includes tracking instances when the transformed signal falls outside the good operating condition matrix and/or within the faulty operating condition baseline matrix. In one embodiment, a fault is declared upon the occurrence of a predetermined number of consecutive tracked instances.

More specifically, in one embodiment, the transformed signal is converted into a test feature vector (or optionally a compressed test feature vector) and compared with the clustered feature data sets that represent good and faulty operating conditions via the Mahalanobis distance and the cluster boundaries. If the test feature vector is within the boundaries of one of the normal operating modes, the feature is labeled normal. Otherwise, it is labeled as a potential fault feature. If the test feature vector is within one of the faulty operating modes, a cause of the potential fault can be readily identified.

To improve accuracy of fault detection, testing and result processing can be repeated a number of times, and the good operating condition and faulty operating condition clustered feature data sets can be updated.

Referring again to FIG. 6, during normal operation of locomotive 28, the signal(s) under consideration along with speed information are acquired using a digital data acquisition system either integral to or separate from processor 34. The signal(s) may be acquired in continuous buffers (one buffer followed by another, continuously), or buffers spaced at regular intervals (for example, every 15 or 30 minutes). The FFT, or power spectrum or energy content within the neighborhood of gear mesh frequency and harmonics and modulations (in case of AC motor voltages/currents) can be stored and compared to the predictions of good and faulty operating condition matrices.

Once a potential fault feature is detected, in one embodiment, the test data is acquired more often and the percentage of potential fault features within a time window is computed. If the percentage of the fault features is less than a pre-specified factor of the false alarm rate, the gear tooth are labeled as normal. Otherwise, the operator is alarmed for a possible gear tooth wear problem.

Under normal operation, data collected is stored, archived, averaged, and communicated over a cellular or satellite link to a remote diagnostic center. The data is trended over a period at remote processor 38 to generate updated baseline, as resulting from normal gear wear, and significant deviations from normal trends are noted.

If processor 36 is programmed to set a "flag" upon the existence of a potential fault, one or more of several actions can be taken upon the occurrence of a flag. For example, traction motor 30 can be turned off if motor operation is not critical, an alarm can indicate the existence of the flag to the train operator/engineer, and/or a request for cellular/satellite communication can be generated with relevant data being sent to remote processor 38 with or without turning off the motor. When an alarm occurs, the locomotive operator may stop the train and examine the oil level in the gear case either via a reading from a gear case oil sensor or by physical examination. Alternatively, the operator may to stop and check at the next fuel or service station or call a remote diagnostic center for help. When the data is sent to the remote diagnostic center, the personnel at the center may choose to examine the data and make any appropriate recommendations to the locomotive operator.

Thus, by using speed, torque, current or voltage spectral analysis in the neighborhood of gear meshing frequencies (or modulated frequencies) and harmonics, according to embodiments of the present invention, initial stages of gear wear or cracking can be detected to prevent serious gear, bearing, motor and road failures arising from loss of lubrication, pinion gear slip, or gear cracking or degradation.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A gear transmission condition monitoring method comprising the steps of:
    identifying gear mesh frequencies that are remote from interfering frequencies;
    forming a good operating condition baseline matrix by, for each of the identified gear mesh frequencies, obtaining a good operating condition signal indicative of gear transmission conditions over a segment of time and transforming the obtained good operating condition signal into a good operating condition time-frequency spectrum;
    forming a faulty operating condition baseline matrix by operating the gear transmission under a plurality of different faulty operating conditions while, for each of the identified gear mesh frequencies, obtaining a faulty operating condition signal over a segment of time and transforming the obtained faulty operating condition signal into a faulty operating condition time-frequency spectrum; and
    then, obtaining a test gear mesh frequency and a test signal over a segment of time, transforming the obtained test signal into a test time-frequency spectrum, and using the test gear mesh frequency, the good operating condition baseline matrix, and the faulty operating condition baseline matrix to examine the test time-frequency spectrum to monitor gear transmission conditions.

2. The method of claim 1 wherein the good and faulty operating condition signals comprise signals representative of speed, current, voltage or torque.

3. The method of claim 1 wherein the plurality of different faulty operating conditions include worn gear and low lubrication conditions.

4. The method of claim 1 wherein identifying the gear mesh frequencies that are remote includes identifying machine speeds for which interfering frequencies are minimized and wherein obtaining the good operating condition, faulty operating condition, and test signals includes obtaining the good operating condition, faulty operating condition, and test signals at the identified machine speeds.

5. The method of claim 1 wherein forming good and faulty operating condition baseline matrices include, for each of the identified gear mesh frequencies, selecting a window of frequency components to form a feature vector.

6. The method of claim 5 wherein forming good and faulty operating condition baseline matrices further include, for each of the identified gear mesh frequencies, selecting a sub-window around the maximum frequency component within the window to form the feature vector.

7. The method of claim 6 further including forming the feature vectors into feature data sets to form distinct baselines for different operating modes.

8. The method of claim 7 further including compressing the feature data sets.

9. The method of claim 8 wherein compressing each respective feature data set includes:
    calculating a covariance matrix of the feature data set;
    performing an eigenvalue decomposition of the covariance matrix; and
    using multiple columns of the eigenvalue decomposition matrix to transform the feature data set to a multi-dimensional compressed vector space.

10. A gear transmission condition monitoring method comprising the steps of:
    forming a good operating condition baseline matrix by, for each of a plurality of different identified gear mesh frequencies, obtaining a good operating condition signal indicative of gear transmission conditions over a segment of time and transforming the obtained good operating condition signal into a good operating condition time-frequency spectrum;
    forming a faulty operating condition baseline matrix by operating the gear transmission under a plurality of different faulty operating conditions while, for each of the identified gear mesh frequencies, obtaining a faulty operating condition signal over a segment of time and transforming the obtained faulty operating condition signal into a faulty operating condition time-frequency spectrum,
    wherein forming the good and faulty operating condition baseline matrices include, for each of the identified gear mesh frequencies, selecting a window of frequency components and a sub-window around the maximum frequency component within the window to form the feature vector, forming the feature vectors into feature data sets to form distinct baselines for different operating modes, compressing the feature data sets, and characterizing a probability distribution function of each respective compressed feature data set; and
    then, obtaining a test gear mesh frequency and a test signal over a segment of time, transforming the obtained test signal into a test time-frequency spectrum, and using the test gear mesh frequency, the good operating condition baseline matrix, and the faulty operating condition baseline matrix to examine the test time-frequency spectrum to monitor gear transmission conditions.

11. The method of claim 10 further including clustering each feature data set by a mean feature vector and a covariance matrix.

12. The method of claim 11 further including determining a statistical boundary for each clustered feature data set.

13. The method of claim 1 wherein using the test gear mesh frequency, the good operating condition baseline matrix, and the faulty operating condition baseline matrix to examine the test time-frequency spectrum includes forming a test feature vector from the test time-frequency spectrum.

14. The method of claim 13 wherein using the test gear mesh frequency, the good operating condition baseline matrix, the faulty operating condition baseline matrix to examine the test time-frequency spectrum further includes obtaining a plurality of test gear mesh frequencies and a plurality of respective test signals over a plurality of respective segments of time, forming a plurality of respective test feature vectors, and tracking instances when the test feature vectors falls outside the good operating condition baseline matrix or within the faulty operating condition baseline matrix.

15. The method of claim 14 further including declaring a fault after a predetermined number of consecutive tracked instances.

16. A method for forming a baseline matrix for use in gear transmission condition monitoring comprising the steps of;
    identifying gear mesh frequencies that are remote from interfering frequencies; and
    for each of a plurality of different ones of the identified gear mesh frequencies:
        obtaining a signal indicative of gear transmission conditions over a segment of time and transforming the obtained signal into a time-frequency spectrum;
        selecting a window of frequency components to form a feature vector; and forming the feature vectors into a feature data sets to form a distinct baseline.

17. The method of claim 16 wherein identifying the gear mesh frequencies that are remote includes identifying machine speeds for which interfering frequencies are minimized and wherein obtaining the signal includes obtaining the signal at the identified machine speeds.

18. The method of claim 16 further including compressing the feature data set.

19. The method of claim 18 further including characterizing a probability distribution function of the compressed feature data set.

20. The method of claim 19 further including clustering the feature data set by a mean feature vector and a covariance matrix.

21. A gear transmission condition monitoring apparatus comprising a processor for:

identifying gear mesh frequencies that are remote from interfering frequencies;

forming a good operating condition baseline matrix by, for each of the identified gear mesh frequencies, obtaining a good operating condition signal indicative of gear transmission conditions over a segment of time and transforming the obtained good operating condition signal into a good operating condition time-frequency spectrum;

forming a faulty operating condition baseline matrix by operating the gear transmission under a plurality of different faulty operating conditions while, for each of the identified gear mesh frequencies, obtaining a faulty operating condition signal over a segment of time and transforming the obtained faulty operating condition signal into a faulty operating condition time-frequency spectrum; and then, obtaining a test gear mesh frequency and a test signal over a segment of time, transforming the obtained test signal into a test time-frequency spectrum, and using the test gear mesh frequency, the good operating condition baseline matrix, and the faulty operating condition baseline matrix to examine the test time-frequency spectrum to monitor gear transmission conditions.

22. The apparatus of claim 21 wherein the good and faulty operating condition signals comprise signals representative of speed, current, voltage or torque.

23. The apparatus of claim 21 wherein the processor is adapted to identify the gear mesh frequencies that are remote by identifying machine speeds for which interfering frequencies are minimized, and to obtain the good operating condition, faulty operating condition, and test signals at the identified machine speeds.

24. The apparatus of claim 21 wherein the processor is adapted to form good and faulty operating condition baseline matrices by, for each of the identified gear mesh frequencies, selecting a window of frequency components to form a feature vector.

25. The apparatus of claim 24 wherein the processor is adapted to form good and faulty operating condition baseline matrices by further forming the feature vectors into feature data sets to form distinct baselines for different operating modes.

26. The apparatus of claim 25 wherein the processor is adapted to form good and faulty operating condition baseline matrices by further compressing the feature data sets.

27. A gear transmission condition monitoring apparatus comprising a processor for:

forming a good operating condition baseline matrix by, for each of a plurality of identified gear mesh frequencies, obtaining a good operating condition signal indicative of gear transmission conditions over a segment of time and transforming the obtained good operating condition signal into a good operating condition time-frequency spectrum;

forming a faulty operating condition baseline matrix by operating the gear transmission under a plurality of different faulty operating conditions while, for each of the identified gear mesh frequencies, obtaining a faulty operating condition signal over a segment of time and transforming the obtained faulty operating condition signal into a faulty operating condition time-frequency spectrum, wherein the processor is adapted to form good and faulty operating condition baseline matrices by, for each of the identified gear mesh frequencies, selecting a window of frequency components to form a feature vector, forming the feature vectors into feature data sets to form distinct baselines for different operating modes, compressing the feature data sets, and characterizing a probability distribution function of each respective compressed feature data set; and then, obtaining a test gear mesh frequency and a test signal over a segment of time, transforming the obtained test signal into a test time-frequency spectrum, and using the test gear mesh frequency, the good operating condition baseline matrix, and the faulty operating condition baseline matrix to examine the test time-frequency spectrum to monitor gear transmission conditions.

28. The apparatus of claim 27 wherein the processor is further adapted to cluster each feature data set by a mean feature vector and a covariance matrix.

29. The apparatus of claim 28 wherein the processor is further adapted to determine a statistical boundary for each clustered feature data set.

* * * * *